United States Patent
Fukui et al.

(10) Patent No.: US 7,940,689 B2
(45) Date of Patent: May 10, 2011

(54) APPARATUS FOR ADMINISTRATING COMMUNICATION AMONG ON-VEHICLE ELECTRONIC CONTROL UNITS

(75) Inventors: Ryusuke Fukui, Oobu (JP); Seiji Miyamoto, Kariya (JP); Takahiro Shidai, Oobu (JP); Waka Noda, Oobu (JP)

(73) Assignee: DENSO Corporation, Kariya (JP)

( * ) Notice: Subject to any disclaimer, the term of this patent is extended or adjusted under 35 U.S.C. 154(b) by 793 days.

(21) Appl. No.: 11/882,290

(22) Filed: Jul. 31, 2007

(65) Prior Publication Data

US 2008/0027588 A1    Jan. 31, 2008

(30) Foreign Application Priority Data

Jul. 31, 2006 (JP) ................. 2006-208444

(51) Int. Cl.
*H04L 12/26* (2006.01)
*H04B 1/44* (2006.01)
*G05D 1/00* (2006.01)

(52) U.S. Cl. .............. 370/252; 370/282; 701/1; 701/48
(58) Field of Classification Search .................. 370/252, 370/254, 282, 389, 401; 701/1, 48
See application file for complete search history.

(56) References Cited

U.S. PATENT DOCUMENTS

| | | | |
|---|---|---|---|
| 6,445,989 B2 | 9/2002 | Nishimura et al. | |
| 6,483,845 B1 | 11/2002 | Takeda et al. | |
| 6,996,113 B2 * | 2/2006 | Kikkawa et al. | 370/401 |
| 7,260,437 B2 * | 8/2007 | Senoo et al. | 700/9 |
| 7,457,301 B2 * | 11/2008 | Furuta et al. | 370/401 |
| 2002/0003781 A1 * | 1/2002 | Kikkawa et al. | 370/254 |
| 2002/0018479 A1 * | 2/2002 | Kikkawa et al. | 370/401 |
| 2003/0152088 A1 * | 8/2003 | Kominami et al. | 370/401 |
| 2005/0249230 A1 | 11/2005 | Bennett et al. | |
| 2006/0013237 A1 * | 1/2006 | Furuta et al. | 370/401 |

FOREIGN PATENT DOCUMENTS

| | | |
|---|---|---|
| EP | 1 136 325 | 9/2001 |
| JP | H03-212751 | 9/1991 |
| JP | 2001-270399 | 10/2001 |

OTHER PUBLICATIONS

Extended European Search Report dated Feb. 16, 2009 issued in corresponding European Application No. 07015126.1-1244.

* cited by examiner

*Primary Examiner* — Hong Cho
(74) *Attorney, Agent, or Firm* — Nixon & Vanderhye P.C.

(57) ABSTRACT

An apparatus is provided for managing communication among a plurality of process means respectively operating on given control programs realizing functions necessary for a vehicle. The plural process means includes a first process means issuing requesting messages for requesting a function and a second process means receiving the requesting message, performing a process requested by each requesting massage, and sending back a response indicating results of the process to the first process means. In the apparatus, storage means stores therein, of the requesting massages issued, only response-waiting messages issued by the first process means and received by the second process means. A measuring component measures an elapse of time from a time when the request stored in the storage is received by the second process means. A determining component determines whether or not the elapse of time measured by the measuring component reaches a preset value.

20 Claims, 8 Drawing Sheets

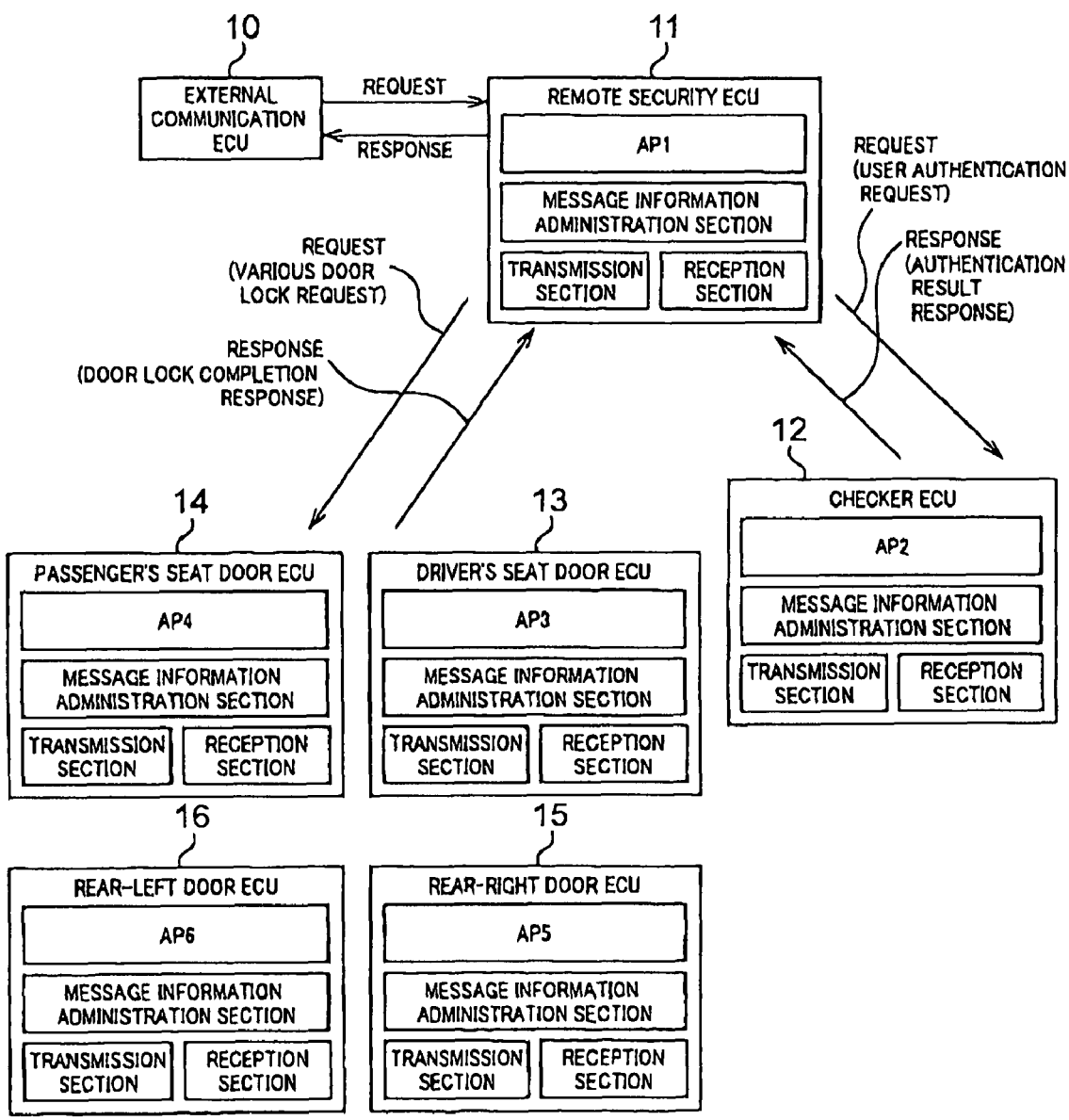

FIG.2 PRIOR ART

MESSAGE INFORMATION ADMINISTRATION TABLE

| INDEX | ROUTE | MESSAGE STATUS | DEADLINE COUNTER | DEADLINE VALUE |
|---|---|---|---|---|
| 1 | AP1⇒AP3 | REQUESTED | 100⇒99 | 100 |
| 2 | AP1⇒AP6 | REQUESTED | 200⇒120 | 200 |
| 3 | AP1⇒AP5 | WAITING REQUEST | — | 300 |
| 4 | AP1⇒AP4 | REQUESTED | 150⇒120 | 150 |
| 5 | AP1⇒AP2 | WAITING REQUEST | — | 300 |
| ⋮ | ⋮ | ⋮ | ⋮ | ⋮ |

| INDEX | REQUEST MESSAGE |
|---|---|
| 1 | DRIVER'S SEAT DOOR LOCK REQUEST |
| 2 | REAR-LEFT SEAT DOOR LOCK REQUEST |
| 3 | REAR-RIGHT SEAT DOOR LOCK REQUEST |
| 4 | PASSENGER'S SEAT DOOR LOCK REQUEST |
| 5 | USER AUTHENTICATION REQUEST |
| ⋮ | ⋮ |

MESSAGE PROCESS SEQUENCE REGULATION SECTION

| MSG# | TOP | |
|---|---|---|
| 2 | 2 | |

| INDEX | AHEAD | BEHIND |
|---|---|---|
| 1 | — | — |
| 2 | 0 | 4 |
| 3 | — | — |
| 4 | 2 | 100 |

REQUEST MESSAGE

MESSAGE PROCESS SEQUENCE REGULATION SECTION

| MSG# | TOP | |
|---|---|---|
| 3 | 2 | |

| INDEX | AHEAD | BEHIND |
|---|---|---|
| 1 | 4 | 100 |
| 2 | 0 | 4 |
| 3 | — | — |
| 4 | 2 | 1 |

FIG.6

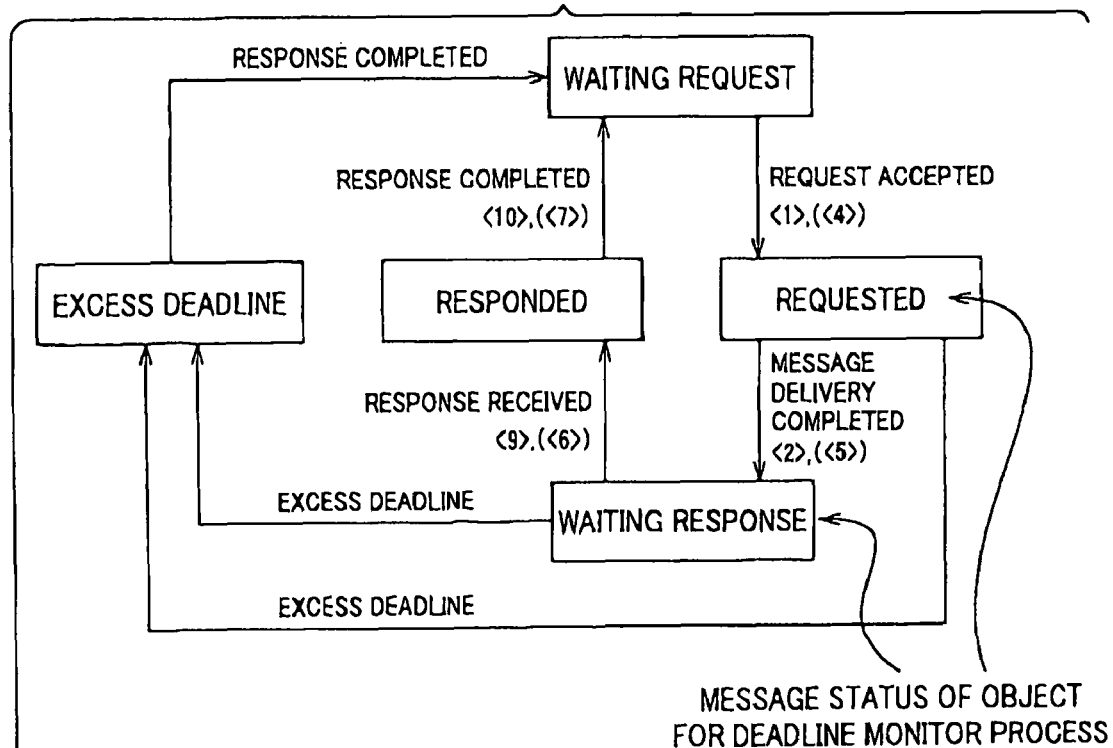

STATUS OF EACH MESSAGE

WAITING REQUEST ··· STATUS OF WAITING REQUEST MESSAGE
REQUESTED ··· STATUS OF ACCEPTING REQUEST MESSAGE
WAITING RESPONSE ··· STATUS OF DELIVERING REQUEST MESSAGE AND WAITING RESPONSE
RESPONDED ··· STATUS OF WAITING RESPONSE CORRESPONDING TO REQUEST MESSAGE
DEADLINE EXCESS ··· STATUS THAT RESPONSE WAITING TIME EXCEEDS DEADLINE

FIG.7

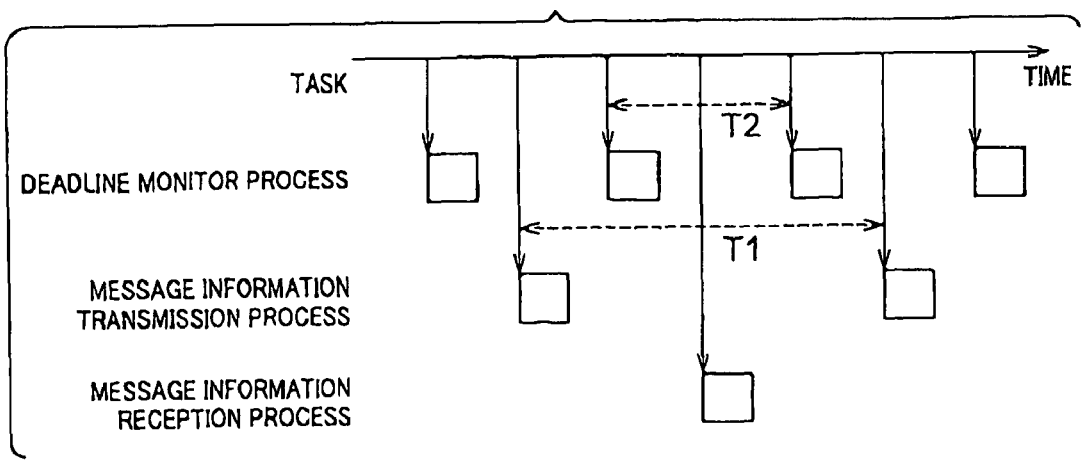

APPARATUS FOR ADMINISTRATING COMMUNICATION AMONG ON-VEHICLE ELECTRONIC CONTROL UNITS

CROSS REFERENCES TO RELATED APPLICATION

The present application relates to and incorporates by reference Japanese Patent application No. 2006-208444 filed on Jul. 31, 2006.

BACKGROUND OF THE INVENTION

1. Field of the Invention

The present invention relates to a distributed type of on-vehicle control system in which a plurality of electronic control programs communicate with each other on messages and responses transmitted and sent thereamong, and in particular, to an apparatus for administrating the messages and responses transmitted and sent among the plurality of control programs.

2. Description of the Related Art

Recently many vehicles are full of electronic devices, which require a control system to control such electronic devices. One type of such control systems is a distributed type of control system with a plurality of application components (hereinafter abbreviated as "APs") assigned to each function necessary for driving a vehicle.

Specifically, "AP" is a control program (also called "application program") to achieve an objective function, and, in detail, is software consisting of program codes composing a control program and data referred while the control program is executed. In the present specification, for the sake of convenience, an expression whose subject is a program, such as "AP does . . . ," is used in some occasions. Such an expression means the performance of functional means achieved by the CPU's execution, or more simply, by contents of the function of the program.

In this kind of control system for vehicles (on-vehicle control system), a plurality of APs work together using messages communicated among the application components, whereby each predetermined function for driving a vehicle is achieved. For example, when some AP sends a requesting message to request another AP to carry out a certain process, the AP which receives the requesting message carries out a corresponding process to the requesting message and sends back the processing result.

In terms of a hardware configuration, each AP is mounted in a separate electronic control unit (ECU), the plurality of ECUs communicate each other via a network build in the vehicle. This is, for example, set forth in Japanese Patent Laid-open (unexamined) No. 2001-270399. As another type, respective APs are mounted in one ECU, in which messages and correspondences are exchanged in the ECU.

In the known on-vehicle control systems one of which is disclosed in the above reference document, it is preferred that the systems are able to carry out a process, called "deadline monitor." This process is prepared for monitoring whether or not a process requested by a message issued from one AP has been completed within a preset period of time. However, in the known on-vehicle control systems, an amount of processing load to perform the deadline monitor is forced to rise.

Simply, the reason is that, since the response-waiting message is searched among all request messages by checking the message status of each of all request messages recorded in the message information administration table, some process is executed to messages which are not issued from an AP, thus not waiting for responses. This reason will be exemplified later in detail together with the description of the preferred embodiment.

SUMMARY OF THE INVENTION

The present invention has been completed with the above problem in mind and has an object to reduce processing load for the deadline monitor process.

In order to achieve the object, as one aspect, the present invention provides a communication administrating apparatus, which is used for an on-vehicle control system. In the on-vehicle control system, a plurality of process means which execute processes in cooperation with each other in order to achieve predetermined functions of the vehicle while each process means operates according to each control program. The process means are means functionally achieved by a CPU(s) executing control programs, and are substantially composed of the control programs. Each process means may be achieved by a different CPU respectively, or may be achieved by a single CPU.

As one aspect of the present invention, there is an apparatus for managing communication among a plurality of process means respectively operating on given control programs realizing functions necessary for a vehicle, the plurality of process means including a first process means issuing requesting messages for requesting a function and a second process means receiving the requesting message issued by the first process means, performing a process requested by each of the requesting messages, and sending back a response indicating results of the process to the first process means.

The managing apparatus comprises storage means, a measuring component, and a determining component. Of these, the storage means stores therein, of the requesting messages issued, only response-waiting messages issued by the first process means and received by the second process means, wherein the response-waiting messages stored in the storage require that the second process means perform the process requested by the response-waiting messages and send back responses to the first process means, but the responses are not sent back from the second process means to the first process means yet.

The measuring component measures an elapse of time from a time when the request stored in the storage is received by the second process means. And the determining component determines whether or not the elapse of time measured by the measuring component reaches a preset value. These measuring and determining processes correspond to part of the deadline monitor processing, where the deadline means the longest elapse of time equivalent to the preset value.

According to the administrating apparatus, the measuring and determining components execute processes (measuring process and deciding process) only to response-waiting message which is actually accepted and waiting completion of the process, whereby a processing load for the deadline monitor process can be reduced. Consequently, even if the measuring and determining components are configured to be achieved by CPU(s) also achieving another process means, hindrances to processes carried out by other process means can be avoided.

Preferably, in the administrating apparatus, the storage means is configured to store information indicative of a sequence of the response-waiting messages stored in the storage means; the measuring component is configured to measure, in the sequence, the elapse of time for each of the response-waiting messages stored in the storage means; and the determining component is configured to determine, in the sequence, whether or not the elapse of time measured for each of the response-waiting messages stored in the storage means reaches the preset value.

According to this configuration, the sequence of the response-waiting message which is an object being processed of the measuring and determining components (i.e., process sequence) can be arbitrarily set.

It is preferred that the information indicative of the sequence shows an order in which the second process means receives the response-waiting messages from the first process means.

Accordingly, the renewal and memorization of sequence information can be executed easily. This is because newly accepted request messages can be simply set at the end of the sequence.

The longer the elapsed time since a response-waiting message, which is the request message outputted at an early stage, is outputted, the earlier in the sequence on which the process of the deadline monitor (i.e., measuring process and deciding process) is executed to the response-waiting message. Therefore, if a preset value used in the deciding process is the same among all request messages, the higher the possibility that a response-waiting message exceeds deadline, the earlier in the sequence on which the process of the deadline monitor is executed to the response-waiting message. Thus the occurrence of the deadline excess is detected at an early stage.

In the meantime, it is preferred that the preset value is defined for every type of the requesting messages and the information indicative of the sequence is information indicative of a sequence of the response-waiting messages each having the elapse of time which is closer to the preset value.

Accordingly, even if the preset value is stipulated per kind of the response-waiting message, the higher the possibility that a response-waiting message exceeds deadline, the earlier in the sequence on which the process of the deadline monitor is executed to the response-waiting message. Thus the occurrence of the deadline excess is detected at an early stage.

In the above message administrating apparatus, it is preferred that the storage means is configured to store the information indicative of the sequence in a data structure with a two-way list. In the two-way list data structure, each element of the list has not only a pointer to an element just behind, but also a pointer to an element just ahead.

According to the two-way list data structure, processes to add and to delete an element or to shuffle the sequence becomes easier. A process becomes easier to delete a response-waiting message from the response-waiting message memory means when a response is obtained corresponding to the response-waiting message, and to add and memorize a request message as a response-waiting message when a new request message is accepted. For example, there is a case where a response corresponding to the response-waiting message which is neither at the top nor the end in the sequence is obtained, and the response-waiting message is deleted from the response-waiting message memory means. In this case, from pointers of an element corresponding to the response-waiting message which is an object being deleted, elements just ahead and just behind of the element may be identified to change the pointers, which are just ahead and just behind the identified elements.

Preferably, the data structure with the two-way list includes an area (hereinafter called "number area") in which data indicative of the number of response-waiting messages stored in the storage means is recorded, an area in which an index identifying a response-waiting message standing at a forefront of the sequence is recorded, and first and second pointer areas which are set respectively for every identifier of each requesting message. In the first pointer area corresponding to the index of each response-waiting message, an index of a response-waiting message preceding the corresponding response-waiting message by one in the sequence is recorded, while, in the second pointer area corresponding to the index of each response-waiting message, an index of a response-waiting message following the corresponding response-waiting message by one in the sequence is recorded.

According to the data structure, the measuring and determining components can decide whether the number of response-waiting messages is 0 or not from the information recorded in the number area. In a case where the number of response-waiting messages is 0, the measuring and determining components need not do anything, whereby wasted processing energy can be efficiently reduced.

As another aspect of the present invention, there is an on-vehicle control system equipped with the above described communication administrating apparatus. According to the on-vehicle control system, the above described effects of the communication administrating apparatus are accomplished.

The on-vehicle control system may be configured as follows. That is, the first process means is provided by a first electronic control unit mounted in the vehicle and the second process means is provided by a second electronic control unit mounted in the vehicle, the first electronic control unit being different from the second electronic control unit, and the communication managing apparatus is arranged in the first electronic control unit.

The first and second electronic control units are communicably connected with each other via a network built in the vehicle such that the requesting messages and the responses are transmitted and received via the network.

According to the control system for vehicles, the above described effects of the communication administrating apparatus are accomplished.

The message administration section may be set both in a requesting-side apparatus (i.e., the first electronic control unit) and in a requested-side apparatus (i.e., the second electronic control unit). In this case, the request message output by the requesting-side process means in the requesting-side apparatus is conveyed from the communication administrating apparatus of the requesting-side apparatus via inside vehicle network to the administrating apparatus of the requested-side apparatus then to the requested-side process means of the requested-side apparatus. Similarly, the response output by the requested process means of the requested-side apparatus is conveyed from the administrating apparatus of the requested-side apparatus via inside vehicle network to the administrating apparatus of the requesting-side apparatus then to the requesting side process means of the requesting-side apparatus.

BRIEF DESCRIPTION OF THE DRAWINGS

In the accompanying drawings:

FIG. 1 is a schematic diagram showing the configuration of a remote control system as an example of a control system for a vehicle of prior art;

FIG. 2 shows contents of the message information administration table of prior art;

FIG. 6 illustrates transition of the message status;

FIG. 7 illustrates executing timing of each task which is a component of the message information administration section;

DETAILED DESCRIPTION OF PREFERRED EMBODIMENTS

Figure 3:
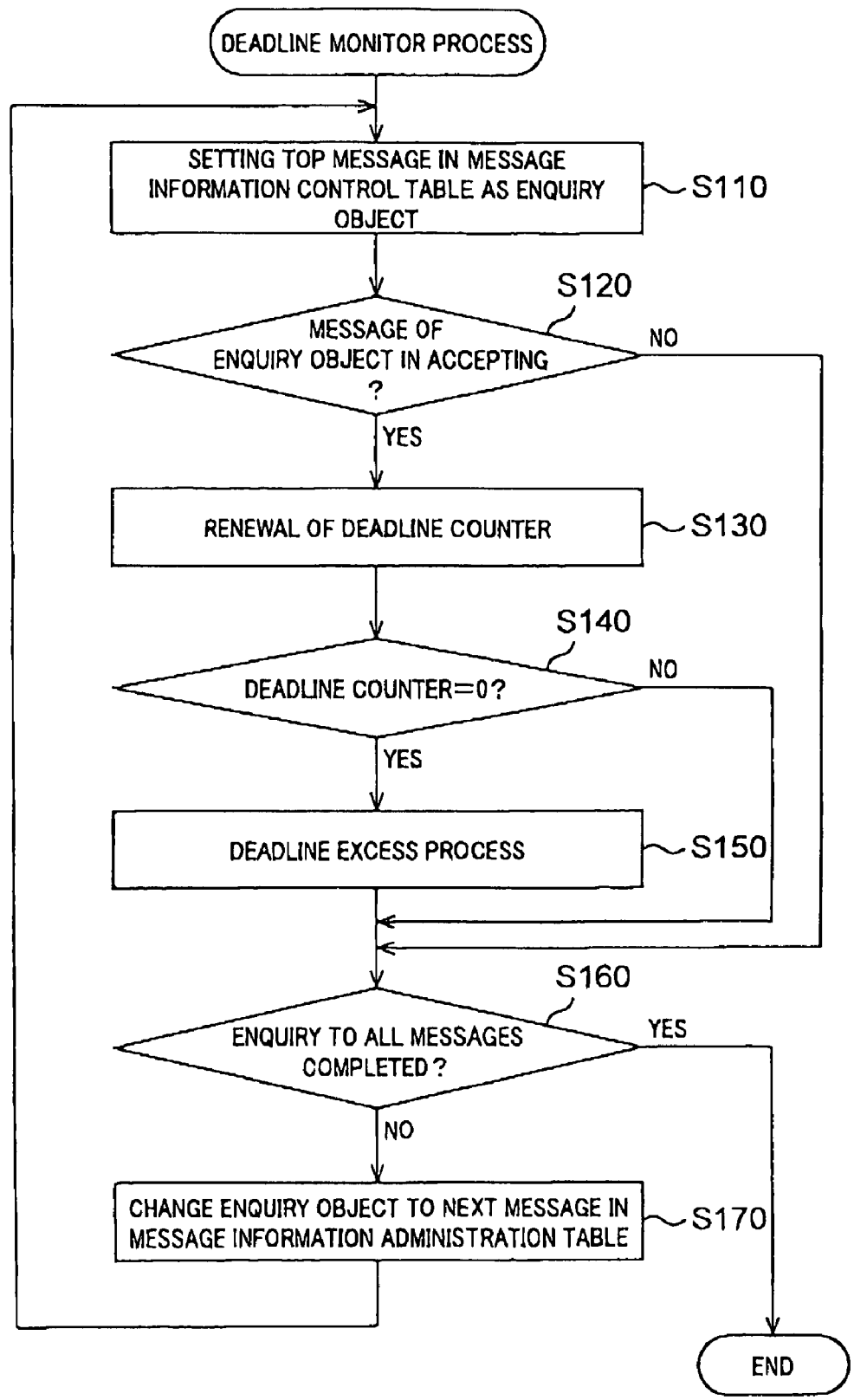
FIG. 3 is a flowchart outlining the deadline monitor process containing problem which the present invention is to solve.

An embodiment of an on-vehicle distributed control system with a plurality of ECUs, which is according to the present invention, will now be described with reference to the accompanying drawings. This on-vehicle distributed control system functionally includes a message administrating apparatus corresponding to a communication administrating apparatus according to the present invention.

The following description is given in a two-stage manner, which is composed of the first description for a system corresponding to a conventional art and the second description for a system according to the present embodiment in which the present embodiment is reduced in practice. It is thus easier to understand a conventional system, the problem with the conventional system, and how the problem is solved by the system according to the present invention.

(i) Conventional System

Now, Referring to FIGS. 1-3, one example of a conventional on-vehicle distributed control system comprising a plurality of ECUs will now be described. In this on-vehicle distributed control system, there is provided a message administrating apparatus functionally embedded in the control system.

The on-vehicle control system exemplified in FIG. 1 is a remote control system which enables a user of the vehicle to perform various actions such as locking doors from a remote place.

The remote control system shown in FIG. 1 comprises an external communication ECU 10 which communicates by wireless directly or via a base station with a user terminal, such as a mobile phone which the user takes along, in addition to a remote security ECU 11, a checker ECU 12, a driver's seat door ECU 13, a passenger's seat door ECU 14, a rear-right seat door ECU 15, and a rear-left seat door ECU 16. The checker ECU 12 performs a user authentication process. The driver's seat door ECU 13 controls lock/unlock and open/close actions of the window of a driver's seat door of the vehicle. The passenger's seat door ECU 14 controls lock/unlock and open/close actions of the window of a passenger's seat door of the vehicle, the rear-right seat door ECU 15 controls lock/unlock and open/close actions of the window of rear-right seat door of the vehicle, and the rear-left seat door ECU 16 controls lock/unlock and open/close actions of the window of a rear-left seat door of the vehicle. These ECUs 10-16 are communicably connected to each other via a communication line (not shown) serving as an in-vehicle network.

In this remote control system, the user terminal sends a requesting message requesting a door lock, for example. Responsively, the requesting message is received by the remote security ECU 11 via the external communication ECU 10.

In the remote security ECU 11, in order to confirm if the requesting message received from the external communication ECU 10 is sent from the user terminal of the normal user, an AP 1 mounted in the ECU 11 outputs a requesting message requesting processing for user authentication (hereinafter called "user authentication request") to an AP 2 mounted in the checker ECU 12, and the user authentication request is sent to the checker ECU 12.

When the checker ECU 12 receives the user authentication request, the AP 2 processes user authentication and outputs a response indicating a processed result (in other words, a response indicating whether authentication is OK or not, hereinafter called "authentication result response"). Then the authentication result response is sent from the checker ECU 12 to the remote security ECU 11.

The requesting message contains an identification code of the user terminal. This identification code may be contained in the user authentication request from the remote security ECU 11 to the checker ECU 12. The AP 2 of the checker ECU 12 performs, as user authentication processing, a judgment whether the identification code from the remote security ECU 11 is identified with the identification code previously stored in the checker ECU 12. If it is identified, the AP 2 executes a process to decide that the checking is OK.

In the remote security ECU 11, the AP 1 judges the authentication result response from the checker ECU 12. If the authentication result response indicates that the authentication is OK, the AP 1 outputs a request message requesting a door lock action (hereinafter called "door lock request") to each of APs 3-6 mounted in door ECUs 13-16 respectively, whereat each door lock request is sent to each of corresponding door ECUs 13-16 from remote security ECU 11.

When each of the door ECUs 13-16 receives a door lock request addressed to its own ECU from the remote security ECU 11, each of the APs 3-6 executes a door lock process to lock each door in response to the door lock request. After that, each of the APs 3-6 outputs a response indicating results of the door lock process (in other words, a response indicating that the door lock process has been completed; hereinafter this process is called "door lock completion response"), whereat the door lock completion response is sent from each of the door ECUs 13-16 to the remote security ECU 11.

In the remote security ECU 11, in response to the door lock completion response, the AP 1 recognizes the lock of each door has been completed. Then the door lock completion response is sent from the remote security ECU 11 to the user terminal via the external communication ECU 10.

When, for example, a request message requesting a window close action is sent from the user terminal, the window of the each door is closed by each of the door ECUs 13-16, with the same procedure done as described above.

Each of the ECUs 11-16 is equipped with a message information administration section which controls exchanges of messages (request messages and responses) among the APs, and equipped with a transmission section and a reception section both for communicating with other ECUs.

The message information administration section makes the transmission section of its own ECU send a request message and a response outputted by the AP of its own ECU to the destination, i.e., another ECU.

For example, when the AP 1 outputs a request message (user authentication request), the message information administration section of the remote security ECU 11 accepts the request message and makes the transmission section of the ECU 11 send the request message to the ECU 12. When the reception section of the ECU 11 receives a response to the request message from the AP 2 (authentication result response), the message information administration section of the remote security ECU 11 acquires the response and supplies it to the AP 1.

The message information administration section will now be detailed. The message information administration section has a message information administration table as shown in FIG. 2.

In the message information administration table, with respect to each index which is an identifier of a plurality of request messages exchanged among the APs, a route of the request messages, a message status, a deadline counter and a deadline value are recorded.

The index, the route, and the deadline value are statically defined information in advance. The route indicates that from which AP to which AP a pertinent request message is sent (i.e., it indicates a requesting AP which outputs a request message and a requested AP which responds to the request message). The deadline value is a value equivalent to the maximum time allowed to wait from when the request message is outputted to when the response is returned. For, example, in the message information administration table shown in FIG. 2, to the request message with index 1 (driver's seat door lock request), information that the requesting AP is the AP 1 and the requested AP is the AP 3 is recorded as the route, and as the deadline, a value of 1000 is recorded.

On the other hand, the message status and the deadline counter are dynamically changed information.

The message status is set up as "waiting request" as the initial status when a pertinent requesting message is outputted from APs. And during the period from when the message information administration section accepts the pertinent request message outputted from the requesting AP to when the message information administration section obtains corresponding response from the requested AP, the message status is set up as another status such as "requested" or "waiting response". After then, when the message information administration section obtains a response from the requested AP and outputs it to the requesting AP, the message status is set back to "waiting".

The deadline counter measures the above period concerning the pertinent requesting message. Specifically, when the message status of the pertinent request message changes from "waiting request" to another status, the above deadline value determined concerning the request message is set up as the initial status of the deadline counter. Then, until the above period ends, the deadline counter is decremented by −1 at a certain time period. After that, when the deadline counter measures 0, it is decided that the deadline excesses (i.e., that the requested process requested by the request message has not been completed within the expected time period).

Such renewal of message status in the message information administration table, setting up of the initial status, and the decrement of the deadline counter and decision of deadline excess are executed by the message information administration section.

With reference to FIG. 3, a description will now be made about a deadline monitor process executed by the message information administration section in order to monitor whether the requested process requested by the request message has been completed within the expected time period or not (i.e., deadline monitor).

In the deadline monitor process shown in FIG. 3, first at step S110, the top request message in the message information administration table (the request message with index 1 in the example in FIG. 2) is set as an inquiry object.

At step S120, the request message, which is the inquiry object, is decided as to whether this is in acceptance or not. When this request message is in acceptance, it means that the processing is within the above period. In other words, it means that the message status in the message information administration table is "requested" or "waiting response".

If the request message, which is the enquiry object, is not in acceptance (S120: NO), the process moves to step S160 without change. But if the request message is in acceptance (S120: YES), the deadline counter corresponding to the request message of enquiry object is decremented at next step S130. The request message is outputted from the AP and accepted by the message information administration section, but its response has not been obtained yet. Hereinafter, the message in this situation may simply be called "response-waiting message." In the deadline counter corresponding to the request message which is the enquiry object, as described before, the deadline value determined concerning the request message is set up as the initial status of the deadline counter when the request message is outputted from the requesting AP and obtained by the message information administration section. At this step S130, the decrement of the deadline counter is made.

Then at next step S140, a decision is made whether the decremented value of deadline counter is 0 or not. If not 0 (S140: NO), the process moves to step S160 without change. If the value of deadline counter becomes 0 (S140: YES), the process moves to step S150 and the deadline excess process is executed, then the process moves to step S160. Concerning the request message which is the inquiry object, the deadline excess process sets up the message status in the message information administration table concerning the request message as a "deadline excess," for example. And concurrently, the deadline excess process notices the error to the requesting AP which outputs the request message, whereat the requesting AP no longer waits a response to the request message, whereby a further standstill of the process can be prevented.

At step S160, a decision is made whether an inquiry to all request messages recorded in the message information administration table has been completed or not. If not completed (S160: NO), the current request message is set up as the next request message in the message information administration table at the next step S170, then the process returns to step S120.

At the above step S160, if the inquiry to all request messages is completed (S160: YES), this deadline monitor process ends without change.

In other words, in the deadline monitor process shown in FIG. 3 by deciding whether each of all request messages recorded in the message information administration table (i.e., all request messages which the AP can output) is in acceptance or not based on its message status, the response-waiting message is searched (S110, S120, S160, S170). And, as concerning the searched response-waiting message, the time measuring process to decrement the deadline counter (S130) and the deciding process whether the value of the deadline counter is 0 or not (S140) are executed.

In the example in FIGS. 1-3, the message information administration section is actually configured by software. A CPU (central processing unit) is provided to execute given programs for achieving the functions of the above message information administration section.

By the way, as described before, in the above described on-vehicle control system, the message information administration section executes the deadline monitor process shown in FIG. 3. Thus there is a problem that processing load for the deadline monitor process is increased.

Specifically, since the response-waiting message is searched among all request messages by checking the message status of each of all request messages recorded in the message information administration table, some processes are executed to the messages which are not in acceptance. For example, in the example shown in FIG. 2, the message status of the request messages with indexes 3 and 5 is a "waiting request", therefore, these request messages are not essentially objects for the deadline monitor, but they are involved in the objects to be processed. Especially, in a case where the message status of all request messages is a "waiting request" (i.e., there is no response-waiting message), all the processes for the search come to nothing. As the number of messages exchanged among the APs increases, the processing load for the deadline monitor increases. This situation may interfere with control processes that require real-time performance.

(ii) System According to the Present Embodiment

As a preferred embodiment of the present, the following new configuration, which is combined with the foregoing known configuration, is provided, so that the combined configurations create a new on-vehicle control system according to the present invention. In this new control system, a communication administrating apparatus according to the present invention is functionally formed as a message administrating apparatus.

Compared with the known on-vehicle control system described with FIGS. 1-3, the on-vehicle control system of this embodiment differs only in the message information administration section comprised in the ECU. Thus, hereinafter, the message information administration section will be mainly described. For the sake of the simplified explanation, while an attention is focused on the remote security ECU 11 and the driver's seat door ECU 13, a description will be made assuming that the ECU 11 is the requesting ECU which outputs a request message, and the ECU 13 is the requested ECU which receives the request message and responds thereto.

Figure 4A:
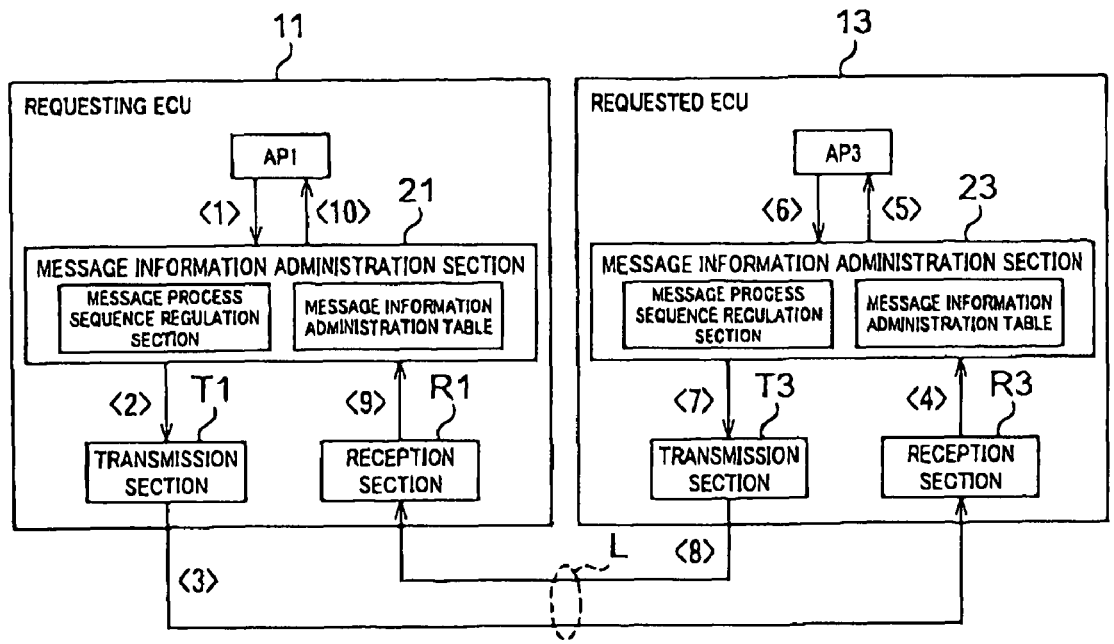
FIG. 4A is a schematic diagram showing the configuration of the on-vehicle control system of the embodiment.

First, as shown in FIG. 4A, the ECU 11 comprises the AP 1, the message information administration section 21, the transmission section T1, and the reception section R1, and the ECU 13 comprises the AP 3, the message information administration section 23, the transmission section T3, and the reception section R3 in the on-vehicle control system of this embodiment. The ECU 11 and the ECU 13 are connected with lines with each other whereby they can communicate.

The message information administration sections 21, 23 mounted in the ECUs 11, 13 respectively are actually configured by software as well as the AP 1 and AP 3 as the processing means, CPUs (not shown) mounted in the ECUs 11, 13 execute programs for achieving the function of the above message information administration sections 21, 23. Since the configuration and the functions of the message information administration sections 21, 23 mounted in the ECUs 11, 13 are essentially the same as those described, an explanation is made hereinafter by taking the message information administration section 21 as an example.

Figure 4B:
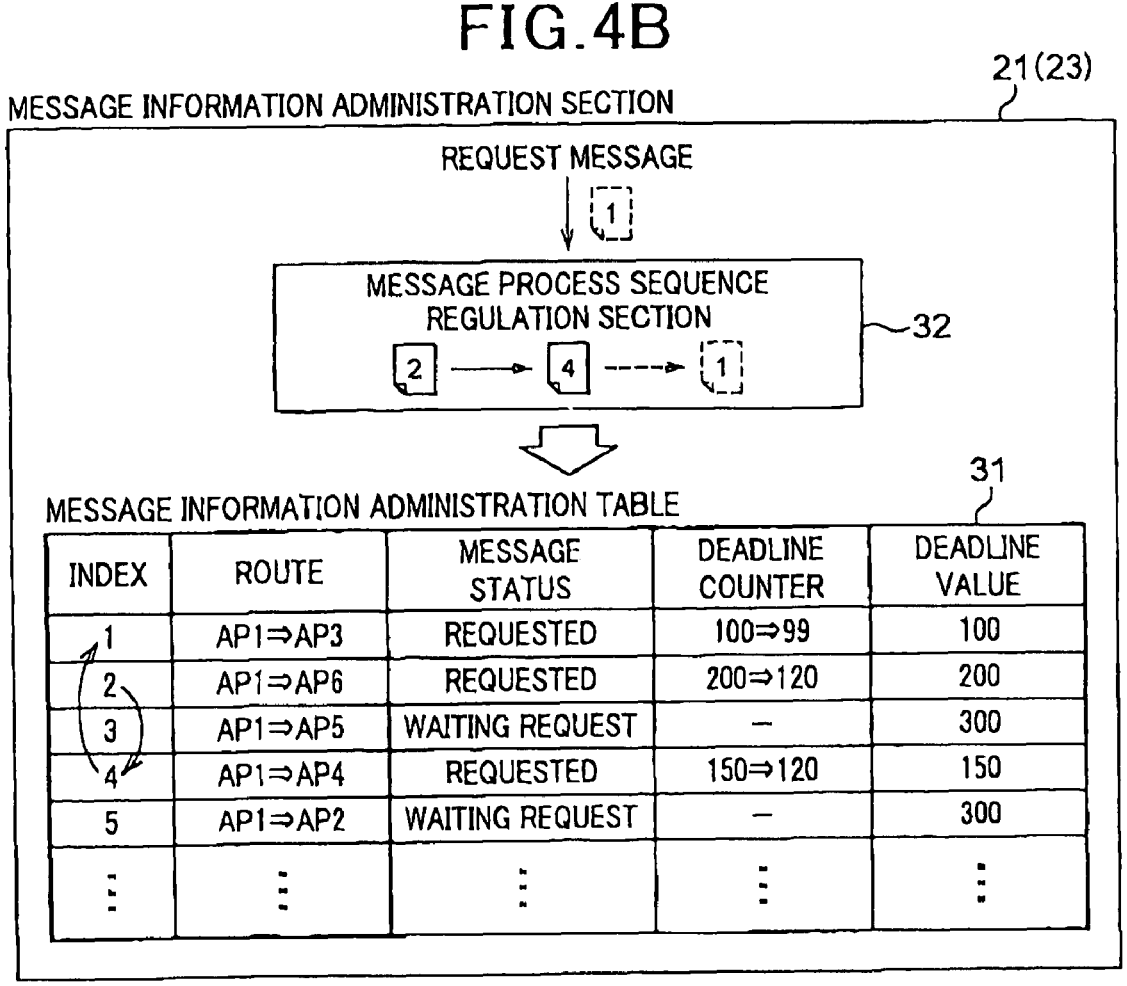
FIG. 4B is a schematic diagram showing the configuration of the message information administration section of the embodiment.

As shown in FIG. 4B, the message information administration section 21 comprises a message process sequence regulation section 32 in addition to the message information administration table previously described with FIG. 2, which is marked by "31" in this embodiment.

The message process sequence regulation section 32 is a list that the message information administration section 21 uses to memorize an accepting request message (response-waiting message) and a sequence of a process (process sequence) to the response-waiting message. Specifically, its data is structured in a two-way list form as shown in FIGS. 5A and 5B.

Hereinafter, the request message with an index number N (integer) is notated as the request message N. In FIGS. 4B and 5A, for example, the request message 2 (rear-left seat door lock request) and the request message 4 (passenger's seat door lock request) outputted from the AP 1 of the ECU 11 have been already memorized in the message process sequence regulation section 32 as the response-waiting message. And in FIGS. 4B and 5B, the request message 1 (driver's seat door lock request) is newly outputted from the AP 1, the request message 1 is to be memorized in the message process sequence regulation section 32 as the response-waiting message. In this embodiment, in the message process sequence regulation section 32, as a process sequence of the response-waiting message, the sequence of the message outputted from an AP and accepted by the message information administration section 21 (i.e., the sequence of the acceptance of the message) is memorized.

Figures 5A, 5B:
FIGS. 5A and 5B Illustrate a message process sequence regulation section.

As shown in FIGS. 5A and 5B, the message process sequence regulation section 32 comprises an "MSG #" area where the numbers of the messages presently in acceptance are memorized, a "TOP" area where the index of a request message which is at the top of the process sequence, and both "AHEAD" and "BEHIND" areas which are allocated to each index of the request message. In the "AHEAD" area corresponding to the index of the response-waiting message, an index of the response-waiting message "one number" ahead of the response-waiting message in the process sequence is memorized. And in the "BEHIND" area corresponding to the index of the response-waiting message, an index of the response-waiting message "one number" behind of the response-waiting message in the process sequence is memorized. In this embodiment, the "AHEAD" area corresponds to the first pointer area, and the "BEHIND" area corresponds to the second pointer area. And those areas are for memorizing sequence information indicating the process sequence.

Therefore, in the case that, for example, while the request message 2 and the request message 4 are memorized as the response-waiting message, sequences "2 to 4" are memorized as their process sequences in the message process sequence regulation section 32, the record status is as shown in FIG. 5A. In the "AHEAD" area corresponding to the top requesting response-waiting message of the sequence (the request message 2 in FIG. 5A), "0" is recorded as the default value. In the "BEHIND" area corresponding to the last requesting response-waiting message of the sequence (the request message 4 in FIG. 5A), "100" is recorded as the default value.

In the status shown in FIG. 5A, when the request message 1 is newly outputted, the record status of the message process sequence regulation section 32 changes to as shown in FIG. 5B. In other words, while the value recorded in the "MSG #" area changes from "2" to "3", the value recorded in the "BEHIND" area corresponding to the index 4 changes from "100" to "1", while, in the "AHEAD" area and the "BEHIND" area corresponding to the index 1, "4" and "100" are newly recorded respectively.

The flow of the message communication between the ECU 11 and the ECU 13, and the transition of the message status will be described with referring to FIGS. 4A and 6, hereupon the numbers in < > in FIGS. 4A and 6 correspond to <1> to <10> in the following explanation. The following explanation will be made with an example that the request message 2 and the request message 4 outputted from the AP 1 have been already memorized in the message process sequence regulation section 32 as the response-waiting message, and the request message 1 is newly outputted from the AP 1, then a corresponding process to the request message 1 (i.e., driver's seat door lock process) is executed before each of corresponding processes to the request messages 2 and 4.

<1> First of all, in the ECU 11, when the AP 1 requests to lock a driver's seat door, the AP 1 outputs the request message 1, which requests to lock a driver's seat door, to the message information administration section 21.

Then, when accepting the request message 1, the message information administration section 21 adds and memorizes the request message 1 as the response-waiting message in the message process sequence regulation section 32 of the message information administration section 21. In addition, the message information administration section 21 adds and memorizes the process sequence of the request message 1. Specifically, the message information administration section 21 changes the record status of the message process sequence regulation section 32 from as shown in FIG. 5A to in FIG. 5B.

The message information administration section 21 renews its own message information administration table 31. Specifically, the message status of the request message 1 accepted this time is changed from "waiting request" to "requested".

<2> In order to send the request message 1 to the ECU 13 which mounts the AP3 therein, the message information administration section 21 then outputs the request message 1 accepted this time and the destination information indicating the destination AP (the AP3, in this example) of the request message 1 to the transmission section T1. Since an index is added to the request message outputted from the AP, the message information administration section 21 identifies the destination of the request message by reading out a route corresponding to the index of the request message from its own message information administration table 31.

Further, the message information administration section 21 renews the message information administration table 31. Specifically, the message status of the request message 1 is changed from "requested" to "waiting response" since the delivery process of the request message 1 has been completed.

<3> Then the transmission section T1 sends the request message outputted from the message information administration section 21 to the ECU 13 via the communication line L. Since the transmission section T1 comprises an information table indicating which AP is mounted in which ECU for example, the transmission section T1 identifies the destination ECU by applying the destination information from the message information administration section 21 to the information table.

<4> On the other hand, the reception section R3 of the ECU 13 receives the request message from the ECU 11 (the AP 1) and sends it to the message information administration section 23.

Also in the ECU 13, when accepting the request message 1, the message information administration section 23 adds and memorizes the request message 1 as the response-waiting message in its own message process sequence regulation section 32. In addition, the message information administration section 23 adds and memorizes the process sequence of the request message 1. If the request message 1 is the only memorized request response-waiting message, for example, in the message process sequence regulation section 32, the value recorded in the "MSG #" area is changed from "0" to "1", the value recorded in "TOP" area is changed from "0" to "1", and in each of the "AHEAD" and "BEHIND" areas corresponding to the index 1, "0" and "100" are recorded respectively.

Further, the message information administration section 23 renews its own message information administration table 31. Specifically, the message status of the request message 1 accepted this time is changed from "waiting request" to "requested".

<5> Then, while outputting the request message 1 accepted this time to the AP 3, the message information administration section 23 renews its own message information administration table 31. Specifically since the delivery of the request message 1 to the AP 3 has been completed, the message status of the request message 1 accepted this time is changed from "requested" to "waiting response".

<6> When accepting the request message 1, the AP 3 executes driver's seat door lock process corresponding to the request message, and after the completion of the process, the AP 3 outputs a driver's seat door lock completion response indicating a driver's seat door lock process has been completed to the message information administration section 23.

The message information administration section 23 then obtains the driver's seat door lock completion response and deletes the request message 1 from its own message process sequence regulation section 32. If the request message 1 is the only memorized request response-waiting message, for example, in the message process sequence regulation section 32, the value recorded in the "MSG #" area is changed from "1" to "0", the value recorded in the "TOP" area is changed from "1" to "0", and in each of the "AHEAD" and "BEHIND" areas corresponding to the index 1, the recorded number is deleted.

The message information administration section 23 then renews its own message information administration table 31. Specifically, the message status of the request message 1 whose response has been obtained is changed from "waiting response" to "responded".

<7> Then, in order to send the driver's seat door lock response obtained from the AP 3 to the ECU 11 which mounts the AP 1 therein, the message information administration section 23 outputs the driver's seat door lock completion response and the destination information indicating the destination AP (the AP1, in this example) of the driver's seat door lock completion response to the transmission section T3. Since the index is added to the response outputted from the AP, the message information administration section 23 identifies the destination of the response (i.e., the origin of the request message corresponding to the response) by reading out a route corresponding to the index of the response from its own message information administration table 31.

Further, the message information administration section 23 renews its own message information administration table 31. Specifically since the delivery of the response corresponding to the request message 1 has been completed, the message status of the request message 1 is changed from "responded" to "waiting request" as the initial status.

<8> The transmission section T3 then sends the driver's seat door lock completion response outputted from the message information administration section 23 to the ECU 11 via the communication line L. Since the transmission section T3 comprises an information table indicating which AP is mounted in which ECU for example, the transmission section T3 identifies the destination ECU by applying the destination information from the message information administration section 23 to the information table.

<9> The reception section R1 of the ECU 11 receives the driver's seat door lock completion response from the ECU 13 (the AP 3) and sends it to the message information administration section 21.

Then, the message information administration section 21 obtains the driver's seat door lock completion response from the reception section R1 and deletes the request message 1 from its own message process sequence regulation section 32.

Specifically, the record status of the message process sequence regulation section 32 is rewritten from as shown in FIG. 5B to in FIG. 5A.

Furthermore, the message information administration section 21 renews its own message information administration table 31. Specifically, the message status of the request message 1 whose response is obtained from the AP 3 is changed from "waiting response" to "responded".

<10> Then, while outputting the driver's seat door lock completion response from the AP 3 to the AP 1, the message information administration section 21 renews its own message information administration table 31. Specifically since the delivery process of the response corresponding to the request message 1 has been completed, the message status of the request message 1 is changed from "responded" to "waiting request" as the initial status. And the AP 1 recognizes from the driver's seat door lock completion response that the driver's seat door lock process by the AP 3 of the ECU 13 has been completed.

Each process executed by the message information administration section 21 of the ECU 11 will now be described referring to FIGS. 7 to 10.

First, FIG. 7 illustrates executing timing of each task which is a component of the message information administration section 21.

The message information administration section 21 comprises a task of message information transmission process, a task of message information reception process, and a task of deadline monitor process. The task of message information transmission process is raised at a given time period T1. The task of message information reception process is raised when information from the other ECU is received by the reception section R1. The task of deadline monitor process is for executing the deadline monitor concerning a request message and raised at a given time period T2 shorter than the time period T1.

Figure 8:
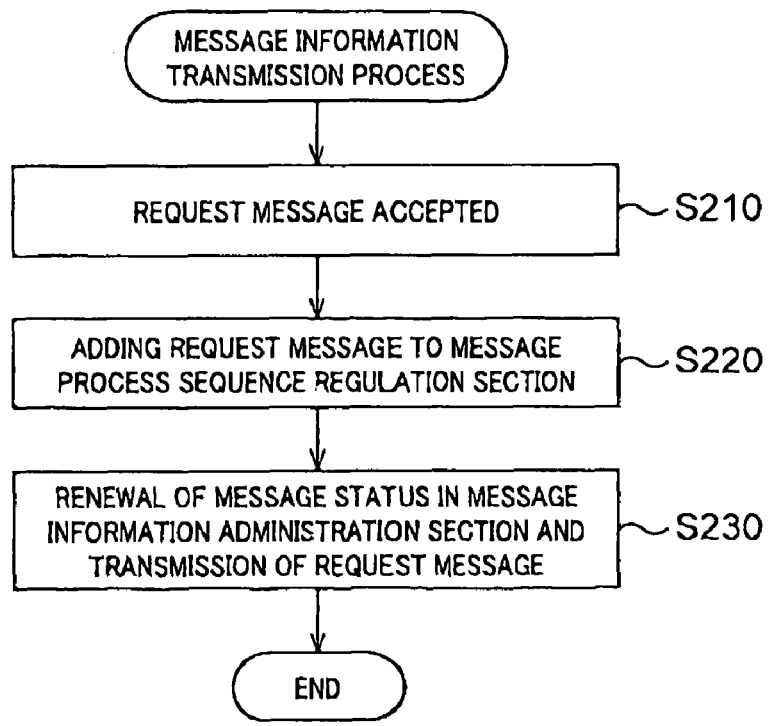
FIG. 8 is a flowchart outlining the message information transmission process.

As shown in FIG. 8, in the message information transmission process, first at step S210, a request message outputted by the AP 1 is accepted. The request message outputted by the AP 1 is memorized in the predetermined memory area of the memory mounted in the ECU 11. At step S210, the request message is accepted by reading the request message outputted by the AP 1 from the memory area.

Next, at step S220, as described in <1>, while the request message accepted this time is add to and memorized in the message process sequence regulation section 32 as the response-waiting message, the process sequence of the request message is added and memorized. Furthermore, at step S220, concerning the request message accepted this time, a deadline value recorded in the message information administration table 31 is set as the initial value of the deadline counter. For example, in a case where the request message 1 is accepted, "100" which is the deadline value of the request message is set as the initial value to the deadline counter of the request message 1 (refer to FIG. 4B).

Then at succeeding step S230, as described in <1> and <2>, while the message status of the request message undergoes a transition from "waiting request", via "requested", to "waiting response" by rotation, by renewing the message information administration table 31, the transmission process of the request message accepted this time is executed. After this, the message information transmission process is ended.

Figure 9:
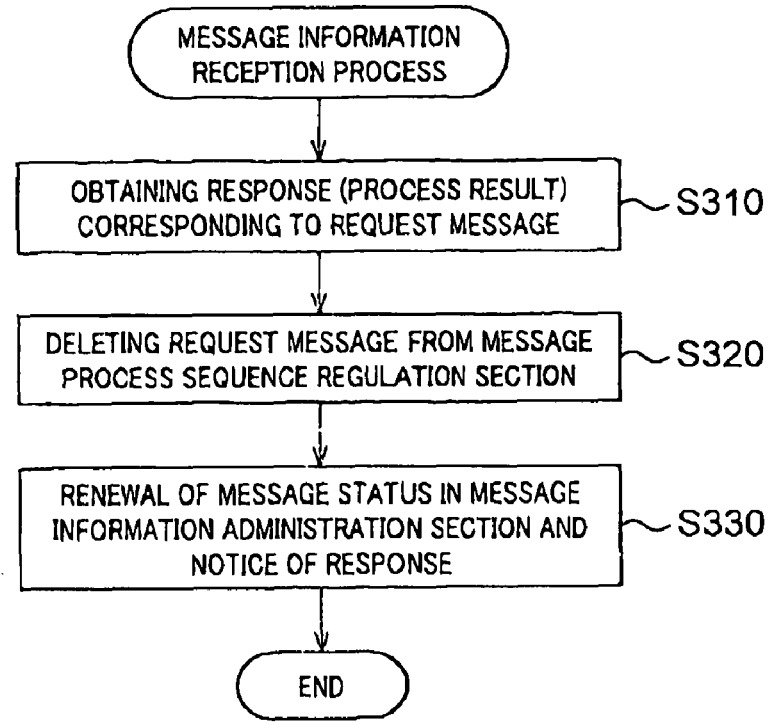
FIG. 9 is a flowchart outlining the message information reception process.

As shown in FIG. 9, in the message information reception process, first at step S310, the response outputted by an AP of another ECU (process result) is obtained from the reception section R1.

Second at step S320, as described in <9>, the request message corresponding to the response obtained this time is deleted from the message process sequence regulation section 32.

Then at succeeding step S330, as described in <9> and <10>, while the message status of the request message undergoes a transition from "waiting response", via "responded" to "waiting request" by rotation, by renewing the message information administration table 31, the response obtained this time is outputted (noticed) to the AP 1. Then the message information reception process is ended.

Figure 10:
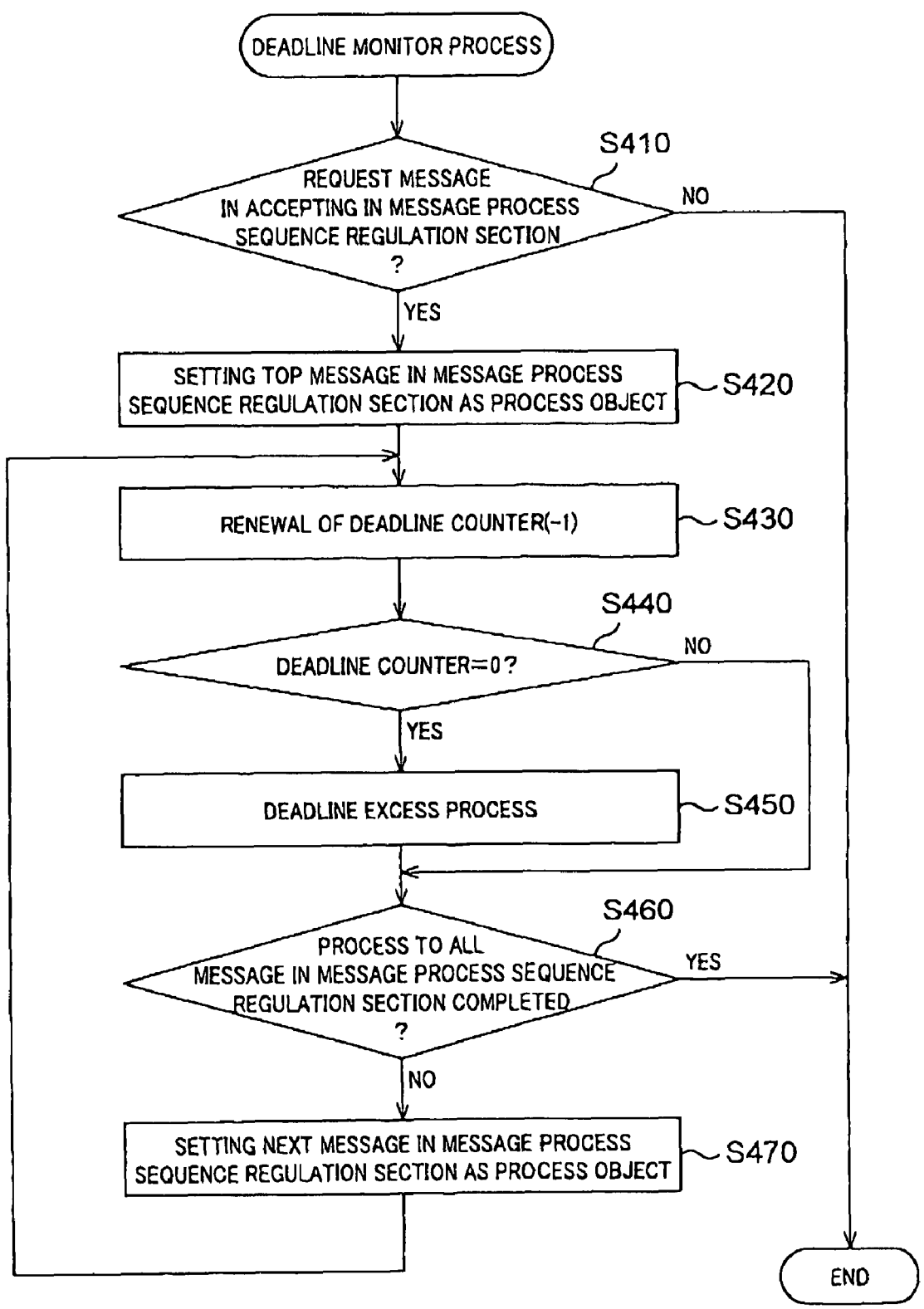
FIG. 10 is a flowchart outlining the deadline monitor process.

Next, as shown in FIG. 10, in the deadline monitor process, first at step S410, it is decided whether a request response-waiting message is memorized in the message process sequence regulation section 32 with referring to the "MSG #" area in the message process sequence regulation section 32. In other words, if the value in the "MSG #" is "0", it is decided that no response-waiting message is memorized.

In a case where it is decided that no response-waiting message is memorized (S410: NO), the deadline monitor process is ended without change.

In a case where is decided that response-waiting messages are still memorized (S410: YES), the processing goes to step S420, where among response-waiting messages memorized with their process sequences in the message process sequence regulation section 32, a top message of the process sequence is set as an object being processed. In other words, the request message whose index is recorded in the "TOP" area in the message process sequence regulation section 32 is set as an object being processed.

Then at succeeding step S430, a deadline counter corresponding to the request message, which is the object being processed, is decremented in the message information administration table 31. The value of the deadline counter corresponding to the request message is initialized at the deadline value corresponding to the request message when the request message is accepted by the message information administration section 21 through the process at step S220 shown in FIG. 8.

At step S440, it is decided whether the value of the deadline counter which is decremented at above described step S430 is 0 or not. If not 0 (S440: NO), the process goes to step S460 without change. If the value is 0 (S440: YES), the process goes to step S450 where the deadline excess process is executed, then the process goes to step S460. The deadline excess process in the requesting ECU sets, as described before, the message status of the request message in the message information administration table 31 as a "deadline excess" (refer to FIG. 6). In the deadline excess process, by noticing an error to the AP (the AP 1 in this example) outputting the request message, the AP is stopped to wait, any more, a response corresponding to the request message which has underwent the deadline excess.

At step S460, it is decided whether the processes at steps S430 and S440 are completed or not to all the response-waiting messages memorized in the message process sequence regulation section 32. If not completed (S460: NO), at succeeding step S470, among response-waiting messages memorized in the message process sequence regulation section 32, the message whose process sequence is next to the present object being processed is set as a new object being processed. Then the process returns to step S430.

For example, assuming that the request message 2, the request message 4, and the request message 1 are memorized with the process sequence from 2 via 4 to 1 in the message process sequence regulation section 32 as shown in FIG. 5B, at step S420, the request message 2 whose index=2 is recorded in the "TOP" area in the message process sequence regulation section 32 is set as the first object being processed. Then at succeeding step S470, the request message 4 whose index=4 is recorded in the "BEHIND" area corresponding to the index=2 in the message process sequence regulation section 32 is set as the next object being processed. Furthermore, at next step S470, the request message 1 whose index=1 is recorded in the "BEHIND" area corresponding to the index=4 in the message process sequence regulation section 32 is set as the next object being processed.

Then at above described step S460, if it is decided that the processes to all response-waiting messages have been completed (S460: YES), the deadline monitor process is ended without change.

Meanwhile, in the requested ECU 13, the message information administration section 23 executes the same process as shown in FIGS. 8-10.

For example, in the ECU 13, the message information administration section 23 executes message information transmission process as shown in FIG. 8, when a request message from other ECU is received by the reception section R3. In the message information transmission process, the message information administration section 23 accepts the request message received by the reception section R3 at step S210. Then at succeeding step S220 as described in <4>, the message information administration section 23 adds and memorizes the request message accepted this time as the response-waiting message in the message process sequence regulation section 32, and in addition, the message information administration section 23 adds and memorizes the process sequence of the request message. Furthermore, the message information administration section 23 sets the value of the deadline counter corresponding to the request message accepted this time to the deadline value corresponding to the request message. Then at succeeding step S230 as described in <4> and <5>, while making the message status undergo a transition, the message information administration section 23 outputs the request message accepted this time to the AP 3.

And in the ECU 13, when a response to the request message is outputted, the message information administration section 23 executes the message information reception process as shown in FIG. 9. In the message information reception process, the message information administration section 23 obtains a response (process result) outputted by the AP 3 first at the step S310. Next at step S320, as described above <6>, the message information administration section 23 deletes the request message corresponding to the response obtained this time from the message process sequence regulation section 32. At succeeding step S330 as described in <6> and <7>, while making the message status undergo a transition, the message information administration section 23 executes a process to send the response obtained this time to the origin which sent the request message corresponding to the response.

Further, in the ECU 13, the message information administration section 23 executes the deadline monitor process as shown in FIG. 10 at regular intervals. In the deadline excess process at step S450 in the deadline monitor process in the ECU 13, the message status of the request message, which is the object being processed, is only set as the "deadline excess" in the message information administration table.

That is, while receiving the request message from the AP 1 within the ECU 11 and supplying the request message to the AP 3 via communication line L, the message information administration section 21 of the ECU 11 receives from the ECU 13 a response outputted by the AP 3 via the communication line L. Therefore, the message information administration section 21 executes the deadline monitor process during the targeted period from <1> to <9> as shown in FIG. 4A.

On the contrary, while receiving the request message outputted by the requesting AP 1 via the communication line L, and supplying the request message to the AP 3, the message information administration section 23 of the ECU 13 receives a response within the ECU 13 and supplies the response to the AP 1 via the communication line L. Therefore, the message information administration section 23 executes the deadline monitor process during the targeted period from <4> to <6> as shown in FIG. 4A.

By the way, in the above embodiment, the ECU 11 is equivalent to the requesting-side apparatus of the present invention, the ECU 13 is equivalent to the requested-side apparatus. The AP 1 is equivalent to requesting-side process means, the AP 3 is equivalent to the requested-side process means, the message information administration sections 21, 23 are equivalent to the message administrating apparatus. And the message process sequence regulation section 32 is equivalent to response-waiting message memory means, the deadline monitor process is equivalent to the measuring and determining components. Furthermore, in the deadline monitor process as shown in FIG. 10, the process at step S430 is equivalent to the measuring process, and the process at step S440 is equivalent to the deciding process.

In the on-vehicle control system of the above described embodiment, among the plurality of kinds of request messages (request messages recorded in the message information administration table 31), the message information administration sections 21, 23 memorize the request response-waiting messages in the message process sequence regulation section 32. And only to the request response-waiting messages memorized in the message process sequence regulation section 32, the deadline monitor process shown in FIG. 10 is executed. In a case where the request message is not memorized in the message process sequence regulation section 32, the deadline monitor process is not substantially executed, whereby the process load for the deadline monitor process can be reduced.

In other words, compared with the deadline monitor method which periodically searches for messages with the status of "requested" or "waiting response" among all messages statically recorded in the message information administration table 31, the process and time for periodical search can be saved.

Thus, according to the embodiment, hindrances to the process of an AP in the ECU (in the above example, the control process to realize the remote control system) can be avoided.

In the embodiment, the process sequence of the response-waiting message is also memorized in the message process sequence regulation section 32, the data structure of the message process sequence regulation section 32 is therefore structured in a two-way list format as shown in FIGS. 5A and 5B.

Thus, the process to delete the request message of which obtaining response has been completed from the message process sequence regulation section 32, and the process to add and memorize newly accepted request messages to the message process sequence regulation section 32 are simplified.

Furthermore, according to the data structure as shown in FIGS. 5A and 5B, by referring to the value recorded in the "MSG #" area, it can be immediately decided whether the number of response-waiting messages is 0 or not. In a case where the number of response-waiting messages is 0, it is not necessary to execute the processes after step S420 as shown in FIG. 10, whereby processes in vain can be effectively reduced.

One embodiment of the present invention is described above, but the present invention is not limited to the above embodiment, the present invention may be embodied in several other forms without departing from the spirit thereof.

For example, the message information administration sections 21, 23 of each ECU may be performed as follows. At step S220 in FIG. 8, after setting the value of the deadline counter corresponding to the request message accepted this time as a deadline value corresponding to the request message, or just before executing the deadline monitor process as shown in FIG. 10, the sections 21, 23 may execute the process to set the process sequence of the response-waiting message memorized in the message process sequence regulation section 32 (specifically, the value of "AHEAD" and "BEHIND" in the message process sequence regulation section 32 as shown in FIGS. 5A and 5B) as the sequence of the response-waiting message whose value of the deadline counter is near 0. In other words, the message information administration sections 21, 23 memorize sequence information of the response-waiting message whose time measured by the countdown at step S430 in FIG. 10 is near the deadline value (equivalent to the preset value) as sequence information indicating process sequence in the message process sequence regulation section 32.

Accordingly, the response-waiting message which has a higher possibility that the value of the deadline counter becomes 0 (i.e., exceeds the deadline), is processed at steps S430 and S440 in the deadline monitor process as shown in FIG. 10 at earlier sequence. As a result, an occurrence of the deadline excess can be detected at an earlier stage.

On the other hand, the message information administration sections 21, 23 may be installed only either in the ECU 11 of the requesting side or in the ECU 13 of the requested side.

As the conformation of the on-vehicle control system, a plurality of APs may be mounted in one ECU, and each AP may exchange request messages and responses via the message information administration section 21 (or 23) within the same ECU.

In addition, the transmission section and the reception section may be configured to consist of hardware circuits only, or may be configured to employ in part software implement.

The present invention may be embodied in several other forms without departing from the spirit thereof. The embodiment and modifications described so far are therefore intended to be only illustrative and not restrictive, since the scope of the present invention is defined by the appended claims rather than by the description preceding them. All changes that fall within the metes and bounds of the claims, or equivalents of such metes and bounds, are therefore intended to be embraced by the claims.

What is claimed is:

1. A communication managing apparatus that manages communication performed among a plurality of control units that operate based on a plurality of application components respectively performing processes for realizing functions necessary for driving a vehicle, the apparatus comprising:
a table in which i) a plurality of types of messages to be issued from the plurality of application components and information indicative of how the messages are routed among the plurality of control units are previously memorized and ii) message states are provided for managing the communication, the messages being stored as identifiers indicative of the messages, the message states showing how current states of the messages are and being updatable;
a first control means for receiving both a message and the information from a first application component among the plurality of application components, updating the message state of the table in response to receiving the message, and transmitting the message to a second application component designated by the information among the plurality of application components, the message received from the first application component being one of the messages previously memorized in the table and requesting that the second application component perform the process assigned thereto and send back results of the process to the first application component;
a second control means for receiving the message transmitted by the first control means, making the second application component perform the process assigned thereto and requested by the received message, sending back to the first application component a response indicating results of the requested process, and updating the message state of the table in response to receiving the message and sending back the response;
a storage configured to be able to store therein the messages;
a storage managing block managing the message to be stored in the storage in response to both the reception of the message and the acquisition of the results such that only specific messages remain in the storage, the specific messages being ones of the messages stored in the table and waiting for responses indicating results of processes requested by the specific messages;
a first determination block that determines whether or not the specific messages remain in the storage;
a measuring block measuring an elapse of time showing how long the specific messages remain in the storage when the first determination block determines that the specific messages remain in the storage; and
a second determination block that determines whether or not the elapse of time measured by the measuring component reaches a preset value.

2. The apparatus of claim 1, wherein the communication managing apparatus is installed in at least one of the plurality of control units.

3. The apparatus of claim 2, further comprising
a performing block performing a predetermined process when the second determination block determines that the elapse of time has reached the preset value.

4. The apparatus of claim 3, wherein the predetermined process is a process to notify the first application component of being an error state of the communication and to make the first application component give up waiting for the responses.

5. The apparatus of claim 3, wherein the storage managing means is configured to store information indicative of a sequence of the specific messages in the storage;
the measuring block is configured to measure, in the sequence, the elapse of time for each of the specific messages stored in the storage; and
the second determination block is configured to determine, in the sequence, whether or not the elapse of time measured for each of the specific messages stored in the storage reaches the preset value.

6. The apparatus of claim 5, wherein the information indicative of the sequence is an order in which the second application component receives the specific messages from the first application component.

7. The apparatus of claim 5, wherein the preset value is defined for every type of the messages and the information indicative of the sequence is information indicative of a sequence of the specific messages each having the elapse of time which is closer to the preset value.

8. The apparatus of claim 5, wherein the storage managing block is configured to store the information indicative of the sequence in a data structure with a two-way list.

9. The apparatus of claim 8, wherein the data structure with the two-way list includes an area in which data indicative of the number of specific messages stored in the storage is recorded, an area in which an index identifying a specific message standing at a forefront of the sequence is recorded, and first and second pointer areas which are set respectively for every identifier of each message, wherein, in the first pointer area corresponding to the index of each specific message, an index of a specific message preceding the corresponding specific message by one in the sequence is recorded, while, in the second pointer area corresponding to the index of each specific message, an index of a specific message following the corresponding specific message by one in the sequence is recorded.

10. The apparatus of claim 1, wherein the communication managing apparatus is installed in each of the plurality of control units.

11. A control system comprising:

a plurality of control units that operate based on a plurality of application components respectively performing processes for realizing functions necessary for driving a vehicle, the plurality of application components including a first application component issuing a message for requesting a function and a second application component receiving the message, performing the process assigned to the second application component in response to reception of the message, and sending back a response indicating results of the process to the first application component; and an apparatus for managing communication among the plurality of control units, the communication including transmission and reception of the message and the response, wherein the communication managing apparatus comprising:

a table in which i) a plurality of types of the message to be issued from the first application component and information indicative of how the messages are routed among the plurality of control units are previously memorized and ii) message states are provided for managing the communication, the message being stored as an identifier indicative of the message, the message states showing how current states of the message are and being updatable;

a first control means for receiving both the message and the information from the first application component, updating the message state of the table in response to receiving the message, and transmitting the message to the second application component, the message received from the first application component being one of the messages previously memorized in the table and requesting that the second application component perform the process assigned thereto and send back the results of the process to the first application component;

a second control means for receiving the message transmitted by the first control means, making the second application component perform the process assigned thereto and requested by the received message, sending back to the first application component the response indicating results of the requested process, and updating the message state of the table in response to receiving the message and sending back the response;

a storage configured to be able to store therein the messages;

a storage managing block managing the message to be stored in the storage in response to both the reception of the message and the acquisition of the results such that only specific messages remain in the storage, the specific messages being ones of the messages stored in the table and waiting for responses indicating results of processes requested by the specific messages;

a first determination block that determines whether or not the specific messages remain in the storage;

a measuring block measuring an elapse of time showing how long the specific messages remain in the storage when the first determination block determines that the specific messages remain in the storage; and a second determination block that determines whether or not the elapse of time measured by the measuring component reaches a preset value.

12. The control system of claim 11, further comprising a performing block performing a predetermined process when the second determination block determines that the elapse of time has reached the preset value.

13. The control system of claim 12, wherein the predetermined process is a process to notify the first process means of being an error state of the communication and to make the first application component give up waiting for the responses.

14. The control system according to claim 12, wherein the first application component is provided in a first electronic control unit mounted in the vehicle so as to serve as one of the control units and the second application component is provided in a second electronic control unit mounted in the vehicle so as to serve as another of the control units, the first electronic control unit being different from the second electronic control unit, the communication managing apparatus is arranged in the first electronic control unit, and the first and second electronic control units are communicably connected with each other via a network built in the vehicle such that the message and the response are transmitted and received via the network.

15. The control system according to claim 14, wherein the first application component is provided in a first electronic control unit mounted in the vehicle so as to serve as one of the control units and the second application component is provided in a second electronic control unit mounted in the vehicle so as to serve as another of the control units, the first electronic control unit being different from the second electronic control unit, the communication managing apparatus is arranged in the second electronic control unit, and the first and second electronic control units are communicably connected with each other via a network built in the vehicle such that the message and the response are transmitted and received via the network.

16. The control system of claim 14, wherein the storage managing means is configured to store information indicative of a sequence of the specific messages in the storage;

the measuring block is configured to measure, in the sequence, the elapse of time for each of the specific messages stored in the storage; and the second determination block is configured to determine, in the sequence, whether or not the elapse of time measured for each of the specific messages stored in the storage reaches the preset value.

17. The control system of claim 16, wherein the information indicative of the sequence is an order in which the second application component receives the specific messages from the first application component.

18. The control system of claim 16, wherein the preset value is defined for every type of the messages and the information indicative of the sequence is information indicative of a sequence of the specific messages each having the elapse of time which is closer to the preset value.

19. The control system of claim 16, wherein the storage managing block is configured to store the information indicative of the sequence in a data structure with a two-way list.

20. The control system of claim 19, wherein the data structure with the two-way list includes an area in which data indicative of the number of specific messages stored in the storage is recorded, an area in which an index identifying a specific message standing at a forefront of the sequence is recorded, and first and second pointer areas which are set respectively for every identifier of each message, wherein, in the first pointer area corresponding to the index of each specific message, an index of a specific message preceding the corresponding specific message by one in the sequence is recorded, while, in the second pointer area corresponding to the index of each specific message, an index of a specific message following the corresponding specific message by one in the sequence is recorded.

* * * * *